W. G. CARROLL.
METER.
APPLICATION FILED APR. 11, 1913.
1,093,685.
Patented Apr. 21, 1914.
2 SHEETS—SHEET 1.
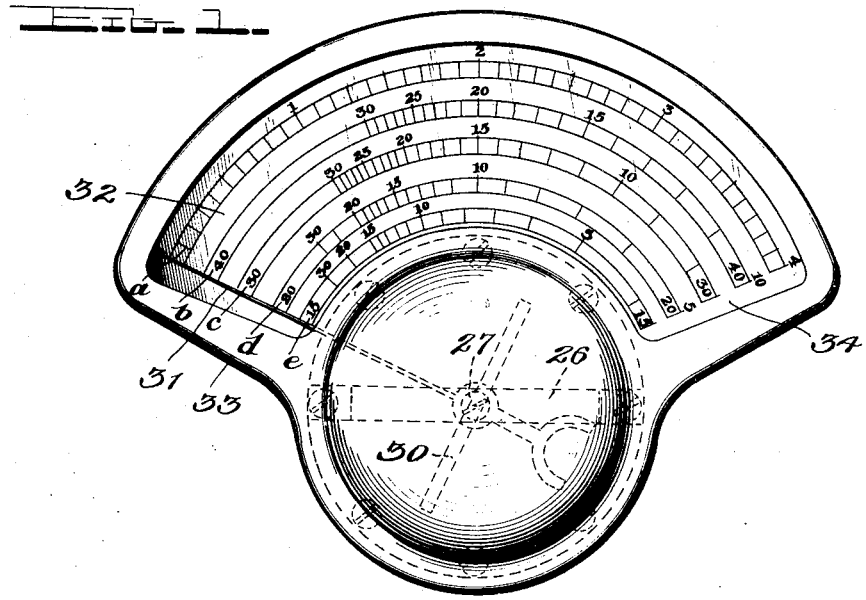
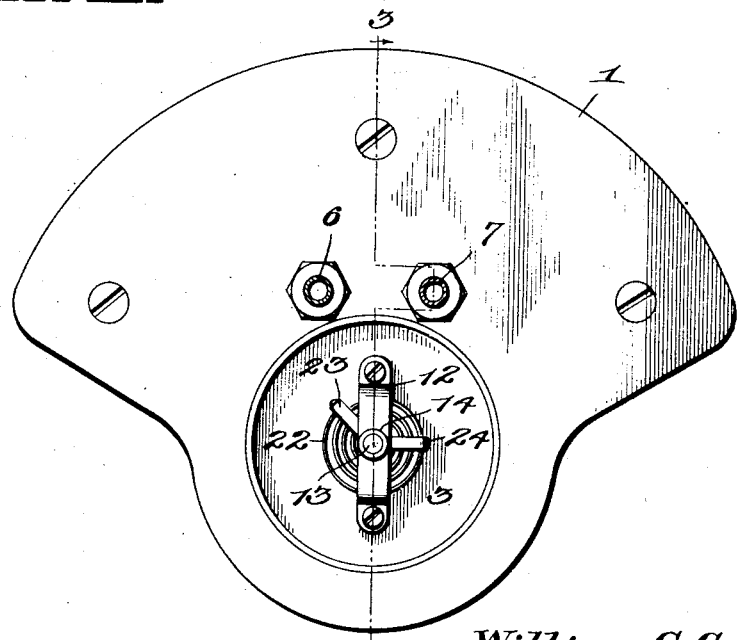
Witnesses
Chas. L. Griesbauer.
F. Wm. Ernst.
Inventor
William G. Carroll,
By Wm. H. Babcock & Son
Attorneys.

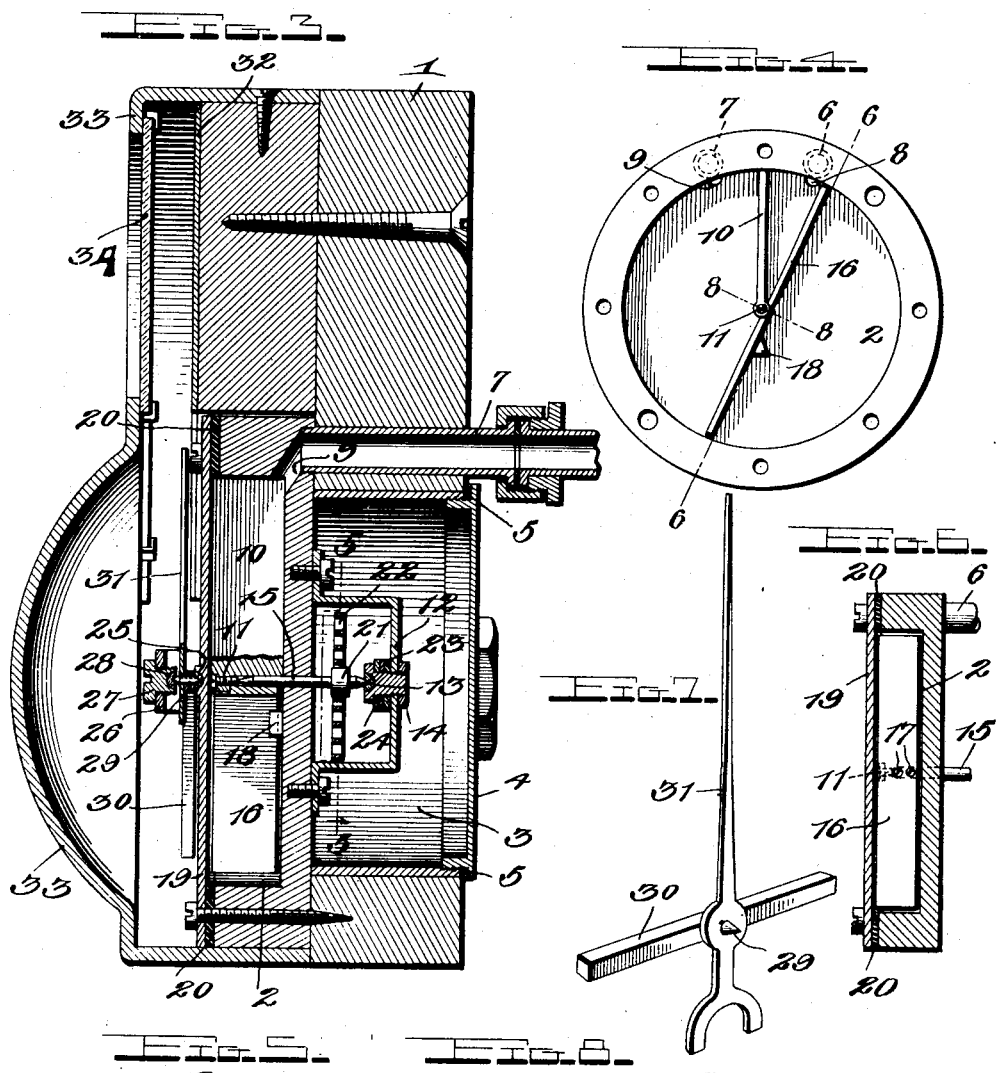

UNITED STATES PATENT OFFICE.

WILLIAM G. CARROLL, OF BEAUMONT, TEXAS.

METER.

1,093,685.  Specification of Letters Patent.  Patented Apr. 21, 1914.

Application filed April 11, 1913. Serial No. 760,446.

*To all whom it may concern:*

Be it known that I, WILLIAM G. CARROLL, a citizen of the United States, residing at Beaumont, in the county of Jefferson and State of Texas, have invented certain new and useful Improvements in Meters, of which the following is a specification.

This invention relates to meters for measuring the flow of liquid and for indicating the flow of liquid in gallons per hour on a dial.

It is primarily intended for use with motor vehicles driven by internal combustion engines, and, in addition to indicating the rate of flow or consumption per hour, is also adapted to indicate how many miles the machine will travel going at various speeds on a gallon of gasolene consumed at various rates of consumption per hour.

It relates more particularly to that class of liquid meters in which magnetic attraction is used as a connection between the vane and the index finger and it can be used to best advantage in connection with a speedometer of the usual type, both this meter and speedometer being preferably mounted on the dash of the machine, as usual, in close proximity to each other.

The chief objects of this invention are to provide a meter which will measure a very slight flow of fluid, to increase the torque action on the vane, to increase the accuracy of the device, to simplify the construction of the device by making several parts each perform several functions heretofore performed by different parts in devices heretofore known, to provide easy means for adjusting the device, to provide easy access to all parts, to reduce possible leakage to a minimum, to provide for compactness, durability and cheap manufacture, and to provide a dial on which the index or pointer will indicate at any time the rate of consumption in gallons per hour and the mileage per gallon at such rate of consumption at any of several different speeds, all of which objects, among others, are attained by the arrangement, construction and combination of parts hereinafter more particularly set forth, described and claimed.

It is to be borne in mind that this invention is capable of a number of embodiments and slight modifications from the form which I prefer and have illustrated in the drawings and will hereinafter describe in the specification, and I therefore am not to be understood as being limited to the same. This form is specially designed for use with an automobile, but it is quite obvious that it could be used equally well with a motor boat, an aeroplane, a stationary engine, or in fact in connection with anything where it is desired to measure the rate or speed or flow of any liquid.

In the accompanying drawings, Figure 1 represents a view in front elevation of a meter embodying my invention; Fig. 2, a rear elevation of the same, the cap to the spring chamber being removed; Fig. 3, a vertical cross-sectional view thereof on line 3—3 of Fig. 2, looking in the direction of the arrows; Fig. 4, a detail of the fluid chamber, showing the magnetic vane in its initial position; Fig. 5, a detail cross-sectional view on line 5—5 of Fig. 3, looking in the direction of the arrows, showing the spring and means of adjusting the same; Fig. 6, a cross-sectional view on the line 6—6 of Fig. 4, showing the clearance around the magnetic vane; Fig. 7, a detail perspective view of the pointer or index and its soft iron, steel or magnetic bar; and Fig. 8, a detail sectional view on line 8—8 of Fig. 4.

Referring now to the drawings in detail, 1 designates the body of my device, which is here shown as being of two pieces secured together by screws, but it is quite obvious that it may be made of any form and any material desired, the office of this body being merely to hold the operative parts in correct relation to each other. The lower front of this body is cut away in an arc, leaving a recess for the reception of the circular metallic gasolene or fluid chamber 2 and the rear portion is bored out in its lower part for the reception of the circular metallic spring chamber 3, which is provided with internal screw threads near its outer end to be engaged by the exterior screw-threads of a cap 4, a washer 5 being interposed between the two to make a tight joint. These two chambers have their centers in the same horizontal line or axis from front to rear of the mechanism. The said body 1 is further bored from the rear for the passage of inlet pipe 6 and outlet pipe 7, said pipes having their inner ends externally screw-threaded to engage the internal screw-threads of two recesses in the rear of the gasolene chamber 2, oblique bores 8 and 9 respectively through the latter forming communication between the interior of said chamber 2 and the interior of pipes 6 and 7. In this chamber 2 is secured the fixed partition 10 extending from the wall of said chamber to the center thereof and from front to rear thereof, the outer end of said partition being between, and equi-distant from, the bores 8 and 9. The lower part of the inner end is cut away as shown in Fig. 3 and the upper part is slightly enlarged and centrally screw-tapped at the center of chamber 2 as shown in Figs. 3 and 4 to receive a small removable screw 11 carrying a jewel bearing in its inner end.

In chamber 3 is fixedly arranged a strap 12 carrying an adjustable bearing 13, said bearing being in the form of a bolt having a screw-threaded outer end passing through strap 12 and engaged by a nut 14 to hold it in position. A shaft 15 passing through the centers of chambers 2 and 3 through the rear wall of chamber 2 is held in position by the bearings 11 and 13 and carries in chamber 2 a magnetic vane 16 secured thereto by means of screws 17 or other suitable means. The fit between the shaft 15 and the bore through the rear wall of chamber 2, and the lower part of the inner end of fixed position 10 is so tight that no appreciable amount of gasolene or other fluid can pass through into chamber 3 or between said shaft and said fixed partition, thus greatly increasing the accuracy of the meter and rendering it possible to remove cap 4 and adjust the instrument while in operation.

The vane 16 is of such dimensions as to provide a slight clearance on both sides and ends between it and the front, rear and inner periphery of said chamber 2, thus allowing the gasolene or other fluid to escape around said vane to the outlet bore 9 and pipe 7, the clearance at the ends being a little greater than on the sides to allow ample area for the flow of gasolene. The interior of the rear wall of chamber 2 is provided with a stop 18 in the form of an isosceles triangle, the two equal inclined sides of which are so arranged and located that the said vane comes in contact with one or the other of them before it can turn past the inlet 6 in one direction or the outlet 9 in the other direction. The fluid entering at 6 necessarily acts first on the side of the vane which is nearest said inlet and then, while turning said vane on its shaft, also passes around the end and sides of the proximate half of said vane, thus reaching the other half which is similarly acted on and impelled, the fluid finally passing around the ends and sides of the latter half to the outlet 9. There is thus a double pressure on the vane by the same flow of fluid, first acting on one half of said vane, then on the other. This increases the torque action and makes the meter very sensitive in measuring a small flow accurately. This chamber 2 has a cover 19, adapted to be secured in position by screws or other suitable means, a washer 20 being interposed between the two to make a perfectly tight joint. On said shaft 15 and near the rear end thereof is shrunk a collar 21, said part of the shaft 15 being located in chamber 3. To said collar 21 is secured by means of a screw or other suitable means the inner end of an adjustable regulating or balance coil-spring 22, the outer end of which is secured by means of a rivet or other suitable means to the depending lug of a regulating bar 23 pivotally mounted on the smooth rounded part of bearing 13. A retainer 23 is also mounted on the rounded part of the said bearing 13, a washer being interposed thereon between said bar and said retainer, the said retainer having a lug adapted to engage the outer edge of the outer coil of said spring and hold the spring in correct position. The said bar and said retainer are held in their respective positions by friction. The cap 4 serves to keep out all dirt, grit and dampness from chamber 3, thus insuring the requisite delicacy of action of said balance spring 22; said cap also prevents any leak of fluid from the instrument. The exterior face of the cover 19 is provided at its center with a jewel bearing 25 and a strap 26 carrying a screw 27 which carries in its inner end a jewel bearing 28 registering with bearing 25 is secured across cover 19. A short shaft 29 carrying fixedly a soft iron, steel or magnetic rod 30 and an index or pointer 31 is journaled in said bearings 25 and 28, the said pointer 31 extending over dial 32.

In the device as illustrated the pointer or index 31 moves from left to right to indicate increase in consumption and decrease in mileage per gallon and from right to left to indicate the reverse. Such movement of the index is caused by the magnetic attraction of the vane on bar 30, the three parts moving together, although there is no mechanical connection between the vane and bar. The dial 32 is arranged and provided with scales in an arc corresponding to the arc of travel of said pointer 31. Said dial 32 is provided with an upper scale $a$, the numerals of which increase from left to right to indicate the rate of consumption of fuel in gallons per hour and thereunder with several scales $b$, $c$, $d$ and $e$ the numerals of which decrease from left to right to show the decrease in mileage per gallon at several rates of travel—namely, 40, 30, 20 and 15 miles per hour, respectively, as the rate of consumption of fuel per hour increases. The front of the body 1 is to be covered by a casing 33 of aluminum or other suitable material having a glass covered sight 34 over the dial, thus protecting the indicator, bearings, dial, &c., from possible injury.

The meter is to be connected in the line pipe from the gasolene tank, not shown, to the carbureter, not shown, the gasolene entering from the tank through inlet 6, passing around the magnetic vane 16, which in its initial position should lie with its upper right end a little to the right of, and adjacent, the bore 8, then out through bore 9 and outlet pipe 7 to the carbureter. In passing around said vane 16 the fluid turns the same clockwise on its shaft or pivot against the action of balance spring 22, the extent of such motion depending on the rate of flow of the fluid. All parts which will be touched by the fluid should be non-corrodible or nickel plated throughout and all bearings should be jewel bearings as stated. The rod 30 is arranged directly in front of, and in line with, the magnetic vane and, being attracted thereby, moves therewith, the pointer 31, being fixed to the same shaft as rod 30, moving with the latter.

To adjust the meter it is connected to a gasolene or other fluid supply of constant pressure and a certain amount of gasolene allowed to flow through it, for example, four gallons per hour, very accurate measurements being taken to see that the amount is exact. The arm 23 is then moved to regulate the balance spring until the pointer 31 is on the last mark indicating four gallons on the scale a. This meter provides means for quickly obtaining the best adjustment and results from a carbureter and serves as an indicator when anything goes wrong, causing greater friction of the working parts and thus showing the defect by the sudden increase in the rate of consumption of gasolene. It has many other uses that are apparent and need not be here detailed.

Having thus described my invention, what I claim as new and desire to secure by Letters Patent is:

1. A magnetic vane and a shaft with which it turns and on which it is mounted at the middle of said vane, in combination with a fluid chamber containing said vane and having an inlet and an outlet, also leaving space for the passage of fluid around each half of said vane on each side of said shaft, a partition between said inlet and outlet extending to said shaft, a stop arranged to prevent said vane from turning in either direction beyond the inlet or outlet and an index turning with said vane by magnetic attraction to register the flow of fluid, though dispensing with mechanical connection between said index and vane.

2. A magnetic vane and a shaft with which it turns and on which it is mounted at the middle of said vane, in combination with a fluid chamber containing said vane and having an inlet and an outlet, also leaving space for the passage of fluid around each half of said vane on each side of said shaft, a partition between said inlet and outlet extending to said shaft, a stop arranged to prevent said vane from turning in either direction beyond the inlet or outlet, a magnetic bar moving with said vane by magnetic attraction but mechanically unconnected thereto, and an index carried by said bar to register the flow of fluid.

3. A magnetic vane oscillating on its middle point, in combination with a fluid chamber in which it turns and which is provided with an inlet and an outlet, indicating means moving with said vane by magnetic attraction and without mechanical connection of said means and vane, a partition between said inlet and outlet compelling the flow of fluid in one direction only, and means preventing said vane from turning past said inlet or outlet, the said vane and coöperating parts being arranged and adapted to insure the action of the fluid twice on the said vane as stated during the passage of such fluid from the inlet to the outlet.

4. A magnetic vane oscillating on its middle point, in combination with a fluid chamber in which it turns and which is provided with an inlet and an outlet, a magnetic bar and index mechanically unconnected to said vane but moving therewith by magnetic attraction, a partition between said inlet and outlet compelling the flow of fluid in one direction only, and means for preventing said vane from turning past said inlet or outlet, the said vane and coöperating parts being arranged and adapted to insure the action of the fluid twice on the said vane in the same direction during the passage of such fluid from the inlet to the outlet.

5. In combination with a magnetic bar and index carried thereby, a magnetic vane oscillating on its middle point and mechanically unconnected to said bar, but magnetically actuating the same, a balance spring for said vane acting on the latter, and a fluid chamber containing said vane and having an inlet and an outlet, said chamber and vane being adapted and provided with means for causing the fluid to act successively on both halves of said vane in the passage of said fluid from the inlet to the outlet, for the purpose set forth.

6. In a meter for liquids, a chamber provided with an inlet and an outlet, a fixed partition extending from the side of said chamber to its center and from front to rear thereof, the outer end of said partition being located between the inlet and outlet, in combination with a shaft having its forward bearing in the inner end of said partition, a magnetic vane attached to said shaft and leaving a slight clearance between its edges and the interior faces of said chamber, and an element traveling with said magnetic vane by magnetic attraction, the fit between the shaft and partition being so close as to prevent the passage of any appreciable amount of fluid therebetween.

7. In a meter for fluids, a chamber provided with an inlet and an outlet, in combination with a stationary partition located therein with its outer end between said inlet and outlet, a magnetic vane pivotally mounted in the center of said chamber and extending nearly across the same, leaving a slight clearance for the passage of fluid, and an element attracted by, and traveling with, said vane.

8. In a meter for fluids, a chamber provided with an inlet and an outlet and a fixed partition located therein and having its outer end connected to the side of said chamber between said inlet and outlet and extending to the center of said chamber and from the front to the rear thereof, in combination with a shaft having its forward bearing in the inner end of said partition and adjustable, said parts making an almost liquid tight fit, a magnetic vane secured to said shaft to turn therewith and of such dimensions as to leave a slight clearance between its edges and the interior faces of said chamber, means for acting on said shaft in the opposite direction to the fluid pressure on the vane, a stop for limiting the travel of said vane, preventing it from traveling over the outlet, and an element attracted by, and traveling with said vane.

In testimony whereof, I have signed my name to this specification in the presence of two subscribing witnesses.

WILLIAM G. CARROLL.

Witnesses:
E. E. TOWNES,
J. V. FLEMING.